(12) United States Patent
Aschenbrenner et al.

(10) Patent No.: US 11,285,841 B2
(45) Date of Patent: Mar. 29, 2022

(54) MULTI-VOLTAGE BATTERY DEVICE AND ONBOARD ELECTRICAL SYSTEM FOR A MOTOR VEHICLE

(71) Applicant: Vitesco Technologies GmbH, Hannover (DE)

(72) Inventors: Tobias Aschenbrenner, Munich (DE); Stefan Lauer, Munich (DE)

(73) Assignee: Vitesco Technologies GmbH

( * ) Notice: Subject to any disclaimer, the term of this patent is extended or adjusted under 35 U.S.C. 154(b) by 13 days.

(21) Appl. No.: 16/771,332

(22) PCT Filed: Dec. 6, 2018

(86) PCT No.: PCT/EP2018/083763
§ 371 (c)(1),
(2) Date: Jun. 10, 2020

(87) PCT Pub. No.: WO2019/115335
PCT Pub. Date: Jun. 20, 2019

(65) Prior Publication Data
US 2020/0339009 A1    Oct. 29, 2020

(30) Foreign Application Priority Data

Dec. 13, 2017    (DE) .................... 10 2017 222 557.2

(51) Int. Cl.
*B60L 58/22*        (2019.01)
*H01M 10/42*        (2006.01)
(Continued)

(52) U.S. Cl.
CPC .............. *B60L 58/22* (2019.02); *B60L 53/20* (2019.02); *H01M 10/4257* (2013.01);
(Continued)

(58) Field of Classification Search
CPC ...... B60L 58/22; B60L 2210/10; B60L 53/20; H01M 10/4257; H01M 2/1077;
(Continued)

(56) References Cited

U.S. PATENT DOCUMENTS 6,583,602 B2    6/2003 Imai et al.
9,837,900 B2 *  12/2017 Sylla ................... H02M 3/1584
(Continued)

FOREIGN PATENT DOCUMENTS

DE    10057259 A1    5/2002
DE    10220939 A1    11/2002
(Continued)

OTHER PUBLICATIONS

German Examination Report for German Application No. 10 2017 222 557.2, dated Aug. 14, 2018. 7 pages.
(Continued)

*Primary Examiner* — Sun J Lin
(74) *Attorney, Agent, or Firm* — RatnerPrestia (57) ABSTRACT

A motor vehicle multi-voltage battery device includes a first output current terminal and a ground terminal providing a first rated voltage; a second output current terminal and the ground terminal providing a second rated voltage; a first battery cell group, electrically connected to the first output current terminal and to the ground terminal; a second battery cell group, electrically connected to the second output current terminal and to the first output current terminal and switchably connected in series with the first battery cell group; a charging current terminal connecting the multi-voltage battery device to an external current source; a first DC voltage converter electrically connected on the input voltage side to the charging current terminal and on an output voltage side to a first positive pole, and configured to convert an input voltage at the charging current terminal to
(Continued)

a first charging voltage for charging the first battery cell group.

20 Claims, 2 Drawing Sheets

(51) Int. Cl.
*H01M 2/10* (2006.01)
*H02J 7/00* (2006.01)
*B60L 53/20* (2019.01)
*H01M 50/20* (2021.01)

(52) U.S. Cl.
CPC ............. *H01M 50/20* (2021.01); *H02J 7/007* (2013.01); *H02J 7/0047* (2013.01); *H02J 7/00306* (2020.01); *B60L 2210/10* (2013.01); *H01M 2010/4271* (2013.01); *H01M 2220/20* (2013.01); *H02J 2207/20* (2020.01)

(58) Field of Classification Search
CPC ....... H01M 2010/4271; H01M 2220/20; H02J 7/007; H02J 7/00306; H02J 2207/20; H02J 7/0047
USPC ........................................................ 320/104
See application file for complete search history.

(56) References Cited

U.S. PATENT DOCUMENTS

| | | |
|---|---|---|
| 2003/0043597 A1 | 3/2003 | Betts-LaCroix |
| 2004/0222771 A1 | 11/2004 | Iwata et al. |
| 2014/0070608 A1* | 3/2014 | Achhammer et al. ...................... B60R 16/033 307/10.1 |
| 2014/0152262 A1 | 6/2014 | Nomoto |

FOREIGN PATENT DOCUMENTS

| | | |
|---|---|---|
| DE | 102007014383 A1 | 10/2008 |
| DE | 102009002279 A1 | 10/2010 |
| DE | 102011012316 A1 | 6/2012 |
| DE | 102015209167 A1 | 11/2016 |
| DE | 102015219589 A1 | 4/2017 |
| DE | 102016207033 A1 | 10/2017 |
| WO | 2014118476 A1 | 8/2014 |

OTHER PUBLICATIONS

International Search Report and Written Opinion for International Application No. PCT/EP2018/083763, dated Feb. 28, 2019, 11 pages.
International Search Report and Written Opinion for International Application No. PCT/EP2018/083763, dated Feb. 28, 2019, 16 pages (German).

* cited by examiner

MULTI-VOLTAGE BATTERY DEVICE AND ONBOARD ELECTRICAL SYSTEM FOR A MOTOR VEHICLE

CROSS REFERENCE TO RELATED APPLICATIONS

This application is the U.S. National Phase Application of PCT International Application No. PCT/EP2018/083763, filed Dec. 6, 2018, which claims priority to German Patent Application No. 10 2017 222 557.2, filed Dec. 13, 2017, the contents of such applications being incorporated by reference herein.

FIELD OF THE INVENTION

The present invention relates to a multi-voltage battery device and an onboard electrical system for a motor vehicle, in particular for a hybrid electric or electric vehicle.

BACKGROUND OF THE INVENTION

Multi-voltage battery devices for the provision of various rated or operating voltages for onboard electrical systems of motor vehicles, in particular hybrid electric or electric vehicles, are known.

As a result of the limited charge capacity available, the multi-voltage battery devices can be discharged beyond their critical charge level, for example in the event that the motor vehicles are stationary for a long time, and some battery cells can be damaged by this. This can in turn lead to malfunctions or faults in the onboard electrical systems.

SUMMARY OF THE INVENTION

An aspect of the invention is a way in which the multi-voltage battery devices, and thereby also the onboard electrical systems of motor vehicles, in particular hybrid electric and electric vehicles, can be protected reliably from malfunctions or defects.

According to a first aspect of the invention, a multi-voltage battery device for a motor vehicle, in particular for a hybrid electric or electric vehicle, is provided.

The multi-voltage battery device comprises a first output current terminal and a ground terminal for the provision of a first rated voltage, for example a first onboard electrical system voltage for an onboard electrical system of the motor vehicle.

The multi-voltage battery device further comprises a second output current terminal that serves, with the ground terminal, for the provision of a second rated voltage, for example a second onboard electrical system voltage for the onboard electrical system.

The multi-voltage battery device further comprises a first battery cell group that has a first positive pole and a first negative pole. The first battery cell group is electrically connected via the first positive pole to the first output current terminal and via the first negative pole to the ground terminal.

The multi-voltage battery device further comprises a second battery cell group that has a second positive pole and a second negative pole. The second battery cell group is electrically connected via the second positive pole to the second output current terminal and via the second negative pole to the first output current terminal. The second battery cell group is further connected via the second negative pole to the first battery cell group, or to the first positive pole of the first battery cell group in series in a switchable manner (with reference to a current path between the second output current terminal and the ground terminal).

The multi-voltage battery device further comprises a charging current terminal for connection of the multi-voltage battery device to an external current source. The charging current terminal here serves in particular exclusively for charging the first and/or the second battery cell group with current from the external current source.

The multi-voltage battery device further comprises a first DC voltage converter that is electrically connected on the input voltage side to the charging current terminal and on the output voltage side to the first positive pole, and thus between the charging current terminal and the first positive pole, and is configured to convert an input voltage applied to the charging current terminal to a first charging voltage for charging the first battery cell group.

An aspect of the invention is based on the idea that a multi-voltage battery device that serves for the provision of various rated voltages or onboard electrical system voltages for various branches of the onboard electrical system of a motor vehicle must, even during an idle phase in which the vehicle (after the end of driving operation) is parked, and only safety-relevant and other relevant functions of the vehicle are carried out, provide a minimal current in order to be able to continue to maintain these relevant functions. For this reason a (first) battery cell group of the multi-voltage battery device is provided to supply systems or components that carry out the relevant functions with current during the idle phase. Since the battery cell group has a limited quantity of electrical energy at the time when the idle phase starts, and is not continuously charged during the idle phase, it is at risk of a deep discharge as a result of the energy consumption by the said systems or components. On top of this, there is a risk of deep discharge as a result of self-discharge of the battery cells of the battery cell group, even in the case of an electrical disconnection of the battery cell group from the said relevant systems or components. The deep discharge can lead to irreversible damage to the battery cells and thus to malfunctions, even to failure of the battery cell group.

To avoid the deep discharge, a facility is needed for charging the battery cell group concerned when needed, and thus protecting it from irreversible damage through deep discharge.

A separate current connection is needed for this, which, independently of the supply current terminal that is present, can be connected from the battery device to current consumers in order to enable a connection of the battery cell group to an (external) current source, and thus a charging process independently of the connection state of the supply current terminal. This furthermore makes it possible that the supply current terminal remains electrically connected to the said systems and components even during the charging process of the battery device. To bring this about, the charging current terminal is provided to the battery device as well as the two output current terminals.

In order to be able to charge the battery device, in particular the first battery cell group, with a specific charging or rated voltage, using current sources of different rated voltages, the DC voltage converter was provided which to convert an input voltage present at the charging current terminal, corresponding, for example, to the rated voltage of a current source, to the charging voltage of the battery device or of the first battery cell group.

Through the implementation with the separate charging current terminal and the DC voltage converter, the battery device, or the first battery cell group, is effectively protected against the irreversible damage from deep discharge.

A facility is thus provided with which multi-voltage battery devices, and therefore also onboard electrical systems of motor vehicles, can be protected reliably against malfunctions or defects.

The multi-voltage battery device further for example comprises a controllable changeover switch that is electrically connected between the first DC voltage converter on the one side and the first and the second positive pole on the other side, and is configured to connect electrically the first DC voltage converter on the output voltage side optionally to the first positive pole or to the second positive pole, and thus to the first or the second battery cell group.

The charging current terminal is, for example, electrically connected to the second positive pole.

The first DC voltage converter is for example further configured to charge the first battery cell group with current of the second battery cell group when necessary, and/or to charge the second battery cell group with current from the first battery cell group when necessary.

The multi-voltage battery device for example further comprises a second DC voltage converter that is electrically connected on the input voltage side to the charging current terminal and on the output voltage side to the second positive pole, and thus between the charging current terminal and the second positive pole, and is configured to convert the input voltage into a second charging voltage for charging the second battery cell group (for example via a suitable current connection between the second battery cell group and the ground terminal and a further controllable switch in this current connection) or both battery cell groups (i.e. both the first and the second battery cell group).

The multi-voltage battery device for example further comprises a battery management arrangement that comprises supply current terminals for connection of the battery management arrangement to a rated voltage source for operation of the battery management arrangement for operating the multi-voltage battery device. The battery management arrangement is electrically connected via the supply current terminals between the first positive pole and the ground terminal, and thus between the first DC voltage converter and the ground terminal. The battery management arrangement is configured to monitor the charge level of the first battery cell group and, in the event that the charge level of the first battery cell group is critical, to operate, to control or to regulate the first DC voltage converter for charging the first battery cell group.

The multi-voltage battery device for example further comprises a first controllable switch that is electrically connected in a first charging current path between the first DC voltage converter and the ground terminal, and thus in series with the first battery cell group. The battery management arrangement further configured, in the event that the charge level of the first battery cell group is critical, to close the first switch for charging the first battery cell group, so that the charging current made available by the first DC voltage converter can flow to the first battery cell group.

The multi-voltage battery device for example further comprises a second controllable switch that is electrically connected in a second charging current path between the charging current terminal and the second battery cell group, and thus in series with the second battery cell group, and thereby electrically connects the second battery cell group to the first battery cell group in a switchable manner. The battery management arrangement further configured to monitor the charge level of the second battery cell group and, in the event that the charge level of the second battery cell group is critical, to close the second switch for charging the second battery cell group or both battery cell groups.

The first and/or the second switch are each, for example, implemented as a relay.

The battery management arrangement is for example further configured, in the event that the charge level of the second battery cell group is critical, to operate, to control or to regulate the second DC voltage converter for charging the second battery cell group or both battery cell groups.

The battery management arrangement is for example further configured to monitor charge levels of the first and of the second battery cell groups. If a critical charge level is ascertained at the first battery cell group, the battery management arrangement is for example further configured to switch the changeover switch into a first switch position in which the changeover switch electrically connects the first DC voltage converter to the first positive pole to charge the first battery cell group. If a critical charge level is ascertained at the second battery cell group, the battery management arrangement is for example further configured to switch the changeover switch into a second switch position in which the changeover switch electrically connects the first DC voltage converter to the second positive pole to charge the second battery cell group or both of the battery cell groups.

The multi-voltage battery device for example further comprises a third controllable switch that is electrically connected between the charging current terminal and the second positive pole. The battery management arrangement is here for example further configured in the event that the charge level of the first or of the second battery cell group is critical, to close the third switch and to place the changeover switch into the first switch position in order to charge the first or the second battery cell group with the current of the respectively other battery cell group. The third switch can also be implemented as a relay.

The input voltage Ue is, for example, smaller or larger than or the same size as the rated voltage of the first battery cell group.

The input voltage Ue is, for example, smaller or larger than or the same size as the sum of the rated voltages of the two battery cell groups.

The first rated voltage lies, for example, at 12 V and/or the second rated voltage at 48 V.

According to a further aspect of the invention, an onboard electrical system for a motor vehicle, in particular for a hybrid electric or electric vehicle, is provided.

The onboard electrical system comprises a first onboard electrical system branch with a first onboard electrical system voltage and a second onboard electrical system branch with a second onboard electrical system voltage. The onboard electrical system further comprises a previously described multi-voltage battery device that is electrically connected via the first output current terminal to the first onboard electrical system branch and via the second output current terminal to the second onboard electrical system branch.

Advantageous configurations of the multi-voltage battery device described above are, insofar as they are transferable to the onboard electrical system mentioned above, should also be regarded as advantageous configurations of the onboard electrical system.

BRIEF DESCRIPTION OF THE DRAWINGS

Exemplary embodiments of the invention are explained in more detail below with reference to the appended drawings, Here.

DETAILED DESCRIPTION

Figure 1:
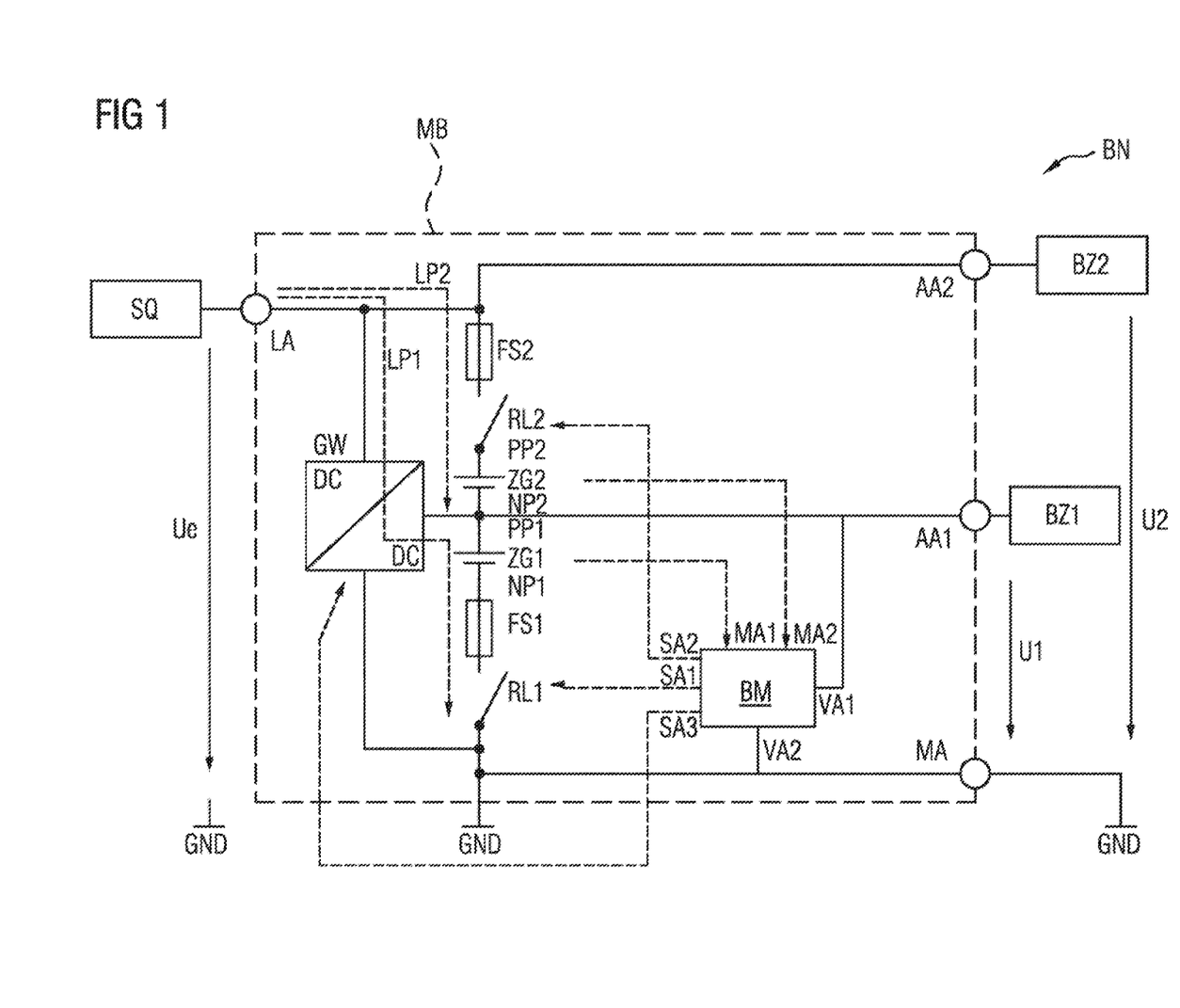
FIG. 1 shows a schematic illustration of an onboard electrical system of a hybrid electric vehicle with a multi-voltage battery device according to an exemplary embodiment of the invention.

The onboard electrical system BN in FIG. 1 comprises a first onboard electrical system branch BZ1 in which a first onboard electrical system voltage U1 with a level of, for example, 12 V is present. The onboard electrical system BN further comprises a second onboard electrical system branch BZ2 in which a second onboard electrical system voltage U2 with a level of, for example, 48 V is present. The onboard electrical system BN is installed in a hybrid electric vehicle with a 48 V mild hybrid drive.

The onboard electrical system BN also comprises a multi-voltage battery device MB for the provision or maintenance of the two onboard electrical system voltages U1, U2.

The multi-voltage battery device MB is constructed as what is known as an AES battery, that is a 48 V battery with a 12 V tap and a DC voltage converter GW.

The multi-voltage battery device MB comprises a first output current terminal AA1 and a ground terminal MA at the current output side, via which the multi-voltage battery device MB is electrically connected to the first onboard electrical system branch BZ1. As a first rated voltage, the multi-voltage battery device MB provides the first onboard electrical system voltage U1 that is present between the first output current terminal AA1 and the ground terminal MA.

The multi-voltage battery device MB further comprises on the current output side a second output current terminal AA2, and is electrically connected via the second output current terminal AA2 and the ground terminal MA to the second onboard electrical system branch BZ2. The multi-voltage battery device MB provides the second onboard electrical system voltage U2 that is present between the second output current terminal AA2 and the ground terminal MA as a second rated voltage.

The multi-voltage battery device MB comprises a first series circuit of a first battery cell group ZG1, a first safety fuse FS1 and a first relay RL1 as a first controllable switch between the first output current terminal AA1 and the ground terminal MA. The first series circuit with the first battery cell group ZG1 thus forms a first current/voltage source for the first onboard electrical system branch BZ1. The first battery cell group ZG1 has a rated voltage with a level of 12 V, and thus provides the first onboard electrical system voltage U1. The first battery cell group ZG1 is here electrically connected via its positive pole PP1 to the first output current terminal AA1, and via its negative pole NP1 (and via the first safety fuse FS1 and the first relay RL1) to the ground terminal MA.

The multi-voltage battery device MB further comprises a second series circuit of a second battery cell group ZG2, a second safety fuse FS2 and a second relay RL2 as a first controllable switch between the first output current terminal AA1 and the second output current terminal AA2. The second battery cell group ZG2 is electrically connected here via its positive pole PP2 (and via the second relay RL2 and the second safety fuse FS2) to the second output current terminal AA2 and via its negative pole NP2 to the first output current terminal AA1.

Between the second output current terminal AA2 and the ground terminal MA, the first and the second series circuits thus form a larger series circuit of the first battery cell group ZG1, the first safety fuse FS1 and the first relay RL1, as well as the second battery cell group ZG2, the second safety fuse FS2 and the second relay RL2, wherein the two battery cell groups ZG1, ZG2 are connected switchably in series with one another via the second relay RL2.

The second series circuit with the second battery cell group ZG2 forms, with the first series circuit with the first battery cell group ZG1, a second current/voltage source for the second onboard electrical system branch BZ2. The second battery cell group ZG2 here has a rated voltage with a level of 36 V, and, with the first battery cell group ZG1 with the rated voltage of 12 V connected in series, provides the second onboard electrical system voltage U2 of 48 V.

The two battery cell groups ZG1, ZG2 are implemented here with lithium ion cells.

The multi-voltage battery device MB further comprises a charging current terminal LA for the connection of the multi-voltage battery device MB to an external current source SQ, wherein the charging current terminal LA serves exclusively for charging the two battery cell groups ZG1, ZG2.

The multi-voltage battery device MB also comprises a DC voltage converter GW that is electrically connected on the input voltage side to the charging current terminal LA and on the output voltage side to the positive pole PP1 of the first battery cell group ZG1, and is configured to convert an input voltage Ue present at the charging current terminal LA to a charging voltage for charging the first battery cell group ZG1.

In the form of embodiment illustrated, the charging current terminal LA is electrically connected via the second safety fuse FS2 and the second relay RL2 to the positive pole PP2 of the second battery cell group ZG2.

The charging current terminal LA, the DC voltage converter GW, the first battery cell group ZG1, the first safety fuse FS1, the first relay RL1 and the ground terminal MA thus form a first charging current path LP1 that can be interrupted by the first relay RL1 in the open state.

The charging current terminal LA, the second safety fuse FS2, the second relay RL2 and the second battery cell group ZG2 similarly form a second charging current path LP2 that can be interrupted by the second relay RL2 in the open state.

The multi-voltage battery device MB can optionally comprise a further DC voltage converter that is electrically connected on the input voltage side to the charging current terminal LA and on the output voltage side to the second safety fuse FS2, and is thus configured as part of the second charging current path LP2 to convert an input voltage Ue present at the charging current terminal LA to a further charging voltage for charging the second battery cell group ZG2.

The multi-voltage battery device MB also comprises a battery management arrangement BM for operating, controlling or regulating the multi-voltage battery device MB. The battery management arrangement BM is electrically connected via supply current terminals VA1, VA2 between the first output current terminal AA1 and the ground terminal MA, and thus in parallel with the first series circuit.

The battery management arrangement BM is electrically connected for measurement on the signal input side via two measurement signal terminals MA1, MA2 to the two battery cell groups ZG1, ZG2, and via these measurement signal terminals MA1, MA2 monitors the charge levels (state of charge, SoC), the aging condition (state of health, SoH) and other properties of the two battery cell groups ZG1, ZG2 in a manner known to the expert.

The battery management arrangement BM is connected for signaling on the signal output side via three (optionally four) control signal terminals SA1, SA2, SA3 to the DC voltage converter GW, the first and the second relay RL1, RL2 (and optionally to the further DC voltage converter), i.e. To respective signal terminals of these components.

The battery management arrangement BM is configured, in a manner known to the expert, to monitor charge levels of the two battery cell groups ZG1, ZG2 and, in the event that charge levels of the respective battery cell groups ZG1, ZG1 are critical, to operate (or to control, regulate and close) the DC voltage converter GW, the two relays RL1, RL2 (and, optionally, the further DC voltage converter if this is present) in the manner to be described below, and thus to charge up the two battery cell groups ZG1, ZG2 and thereby protect them from damage through deep discharge.

If the vehicle is parked following a driving operation and goes into idle mode, safety-relevant and other relevant functions of the vehicle continue to be carried out. Electrical systems or components such as, for example, sensors, bus systems and control devices that carry out these functions accordingly continue to consume current.

As a rule, these systems or components have a rated voltage of 12 V (12 V consumers), and are therefore connected to the first onboard electrical system branch BZ1 and are supplied with current by the first battery cell group ZG1—including when the vehicle is in idle mode.

When the vehicle is in idle mode, the second relay RL2 is usually opened under the control of the battery management arrangement BM, and the second battery cell group ZG2 is electrically disconnected from the onboard electrical system BN and thus from current consumers with a rated voltage of 48 V.

The first relay RL1 however remains closed under the control of the battery management arrangement BM in order to ensure a continuous supply of the previously mentioned 12 V consumers, i.e. the systems or components that carry out the safety-relevant and other relevant functions when the vehicle is in idle mode.

The majority of these 12 V consumers are accordingly also in an idle mode, and thus have a significantly reduced current consumption.

The first battery cell group ZG1, provided it is sufficiently charged at the moment at which the vehicle enters idle mode, can continue to supply the 12 V consumers with current over a certain period of time of several days or weeks.

For this purpose, the battery management arrangement BM closes the first relay RL1, or holds it in the closed switch state, so that the current supply is ensured for the 12 V consumers.

If, after the certain period of time, the lithium-ion cells of the first battery cell group ZG1 are discharged sufficiently far, the cells are at risk of irreversible damage due to deep discharge.

This risk of deep discharge is recognized by the battery management arrangement BM by monitoring the charge level of the first battery cell group ZG1 and comparing it with a predefined minimum charge level of, for example, 5%.

The battery management arrangement BM thereupon controls or regulates the DC voltage converter GW in such a way that it charges the first battery cell group ZG1 with current from the external current source SQ (for example by means of an external 12 V charging device, e.g. in an external starting procedure) via the first charging current path LP1. The battery management arrangement BM here controls the first relay RL1 to remain closed, and thus forms a charging circuit via the first charging current path LP1 for charging the first battery cell group ZG1. Before the start of the charging procedure, the battery management arrangement BM may check whether individual battery cells of the first battery cell group ZG1 have been damaged irreversibly. If damaged battery cells are ascertained, the battery management arrangement BM is able not to start the charging procedure at all, and to output a damage message to a central servicing system. If damage is not ascertained at battery cells, the battery management arrangement BM starts the charging procedure in that it closes the first relay RL1 and regulates the DC voltage converter GW to charge the first battery cell group ZG1.

The battery management arrangement BM additionally monitors the charging voltage immediately before and during the charging procedure, and regulates the DC voltage converter GW in such a way that the predefined maximum permissible charging voltage is not exceeded. The first battery cell group ZG1 can here to charge with external current sources SQ having different rated voltages of, for example, from 1 V up to 60 V or higher, wherein this rated voltage is then stepped up or down by the DC voltage converter GW to the 12 V charging voltage.

The charging of the first battery cell group ZG1 here takes place exclusively with the current provided via the charging current terminal LA. No current flows from the first output current terminal AA1 to the first battery cell group ZG1 during the charging process.

The battery management arrangement BM also opens the second relay RL2 and holds it in the open state during the charging procedure of the first battery cell group ZG1, so that the second battery cell group ZG2 is potentially disconnected from the first battery cell group ZG1, and no current flows from the second battery cell group ZG2 into the first battery cell group ZG1.

The current supply for the battery management arrangement BM takes place, if the first battery cell group ZG1 has an adequate charge level, by means of the first battery cell group ZG1 with the first relay RL1 closed. In the case of a critical charge level of the first battery cell group ZG1, and during the charging process of the first battery cell group ZG1, the supply of current for the battery management arrangement BM occurs, for example, by means of the external current source SQ via the charging current terminal LA.

The battery management arrangement BM similarly also monitors the charge level of the second battery cell group ZG2, and if there is a risk of a deep discharge charges this in a controlled manner in the way to be described below.

If the charge level of the second battery cell group ZG2 falls below a further predefined minimum charge level of the second battery cell group ZG2, the battery management arrangement BM closes the second relay RL2 in addition to the first relay RL1, and charges the two battery cell groups ZG1, ZG2 simultaneously as a 48 V battery group with the current from the external current source SQ via the first and the second charging current path LP1, LP2. The ideal input voltage Ue for simultaneously charging the two battery cell groups ZG1, ZG2 lies between 36 and 60 V.

If the further DC voltage converter is connected in the second charging current path LP2 between the charging current terminal LA and the second safety fuse FS2, then the charging voltage of the second battery cell group ZG2 can be controlled with it. The ideal input voltage Ue for simultaneously charging the two battery cell groups ZG1, ZG2 with the two DC voltage converters GW lies between 36 and 60 V.

If, for example, a 48 V belt starter generator or another current source with a corresponding rated voltage is electrically connected in the second onboard electrical system branch BZ2, the second output current terminal AA2 can also act as a further charging current terminal for charging the two battery cell groups ZG1, ZG2, wherein, in this case, the two battery cell groups ZG1, ZG2 can if necessary be charged with current from the belt starter generator or of the other current source via this further charging current terminal. In just the same way, the first output current terminal AA1 can also act as a further charging current terminal for charging the first battery cell group ZG1 if, for example, a 12 V generator or another current source with a corresponding rated voltage is electrically connected in the first onboard electrical system branch BZ1, and when required can supply charging current for charging the first battery cell group ZG1.

The battery management arrangement BM is, for example, further configured to operate the DC voltage converter GW when required in such a way that it to charge the first battery cell group ZG1 with current from the second battery cell group ZG2, and/or the second battery cell group ZG2 with current from the first battery cell group ZG1.

Figure 2:
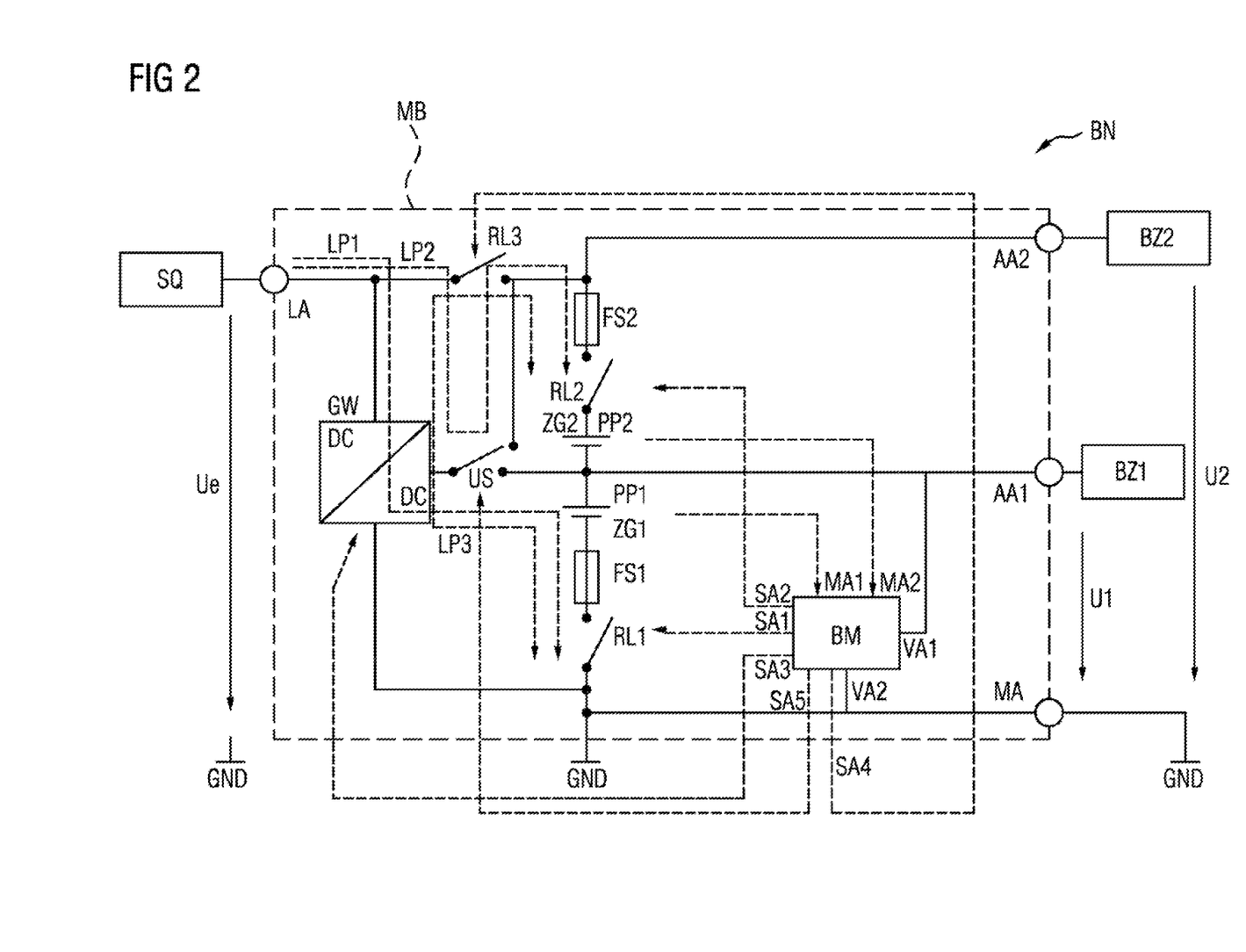
FIG. 2 shows a further schematic illustration of a further onboard electrical system of a hybrid electric vehicle with a further multi-voltage battery device according to a further exemplary embodiment of the invention.

The onboard electrical system BN in FIG. 2 differs from the onboard electrical system illustrated in FIG. 1 in that its multi-voltage battery device MB comprises a third relay RL3 and a controllable changeover switch US in addition to the first and second relays.

The third relay RL3 is electrically connected here between the charging current terminal and the second positive pole. The third relay RL3 serves to connect electrically the charging terminal or the DC voltage converter GW to the second positive pole PP2, and thus to the second battery cell group ZG2 when required under the control of the multi-voltage battery device MB.

The changeover switch US is electrically connected between the DC voltage converter GW on the one side and the positive pole PP1 of the first battery cell group ZG1 and the positive pole PP2 of the second battery cell group ZG2 on the other side, and is configured to connect electrically, under the control of the multi-voltage battery device MB, the DC voltage converter GW on the output voltage side optionally to the positive pole PP1 of the first battery cell group ZG1 or to the positive pole PP2 of the second battery cell group ZG2.

In this form of embodiment, the battery management arrangement BM is connected for signaling via a respective further signal output SA4, SA5 to the control terminal of the third relay RL3 or to the control terminal of the changeover switch US.

In this form of embodiment, the battery management arrangement BM is here configured to monitor charge levels of the first and of the second battery cell groups ZG1, ZG2, and operates the third relay RL3 and the changeover switch US in addition to the first and second relay RL1, RL2 depending on the charge levels of the two battery cell groups ZG1, ZG2 ascertained and on the connection status of the multi-voltage battery device MB to the external current source SQ.

If the external current source SQ is not connected and if, in addition, (only) one of the two battery cell groups ZG1, ZG2 has a critical charge level, then the battery management arrangement BM closes all three relays RL1, RL2, RL3 and switches the changeover switch US into a first switch position in which the changeover switch US electrically connects the DC voltage converter GW on the output voltage side to the positive pole PP1 of the first battery cell group ZG1. In this switch state of the three relays RL1, RL2, RL3 and of the changeover switch US, the battery management arrangement BM enables a transfer of charge between the two battery cell groups ZG1, ZG2, and thus charges the battery cell group with the critical charge level with current from the other battery cell group via a third charging current path LP3 between the two battery cell groups ZG1, ZG2 via the DC voltage converter GW, the changeover switch US and both the first and the second relays RL1, RL2.

If a critical charge level is ascertained at the first battery cell group ZG1, the DC voltage converter GW charges (under the control and regulation of the battery management arrangement BM) the first battery cell group ZG1 with the current from the second battery cell group ZG2. If, on the other hand, a critical charge level is ascertained at the second battery cell group ZG2, the DC voltage converter GW charges (under the control and regulation of the battery management arrangement BM) the second battery cell group ZG2 with the current from the first battery cell group ZG1.

If, on the other hand, the external current source SQ is connected and makes adequate charging current available. The battery management arrangement BM charges both battery cell groups ZG1, ZG2, in accordance with their charge levels, with the current from the external current source SQ.

If a critical charge level is ascertained at the first battery cell group ZG1, the battery management arrangement BM closes the first relay RL1 and simultaneously opens the second and the third relays RL2, RL3. The battery management arrangement BM further switches the changeover switch US into the first switch position, and thereby electrically connects the DC voltage converter GW on the output voltage side to the positive pole PP1 of the first battery cell group ZG1. The battery management arrangement BM thereby charges the first battery cell group ZG1 with the current of the current source SQ via a first charging current path LP1 between the charging terminal LA and the first battery cell group ZG1 via the DC voltage converter GW, the changeover switch US and the first relay RL1.

If a critical charge level is ascertained at the second battery cell group ZG2, the battery management arrangement BM closes the first and the second relay RL1, RL2 and simultaneously opens the third relay RL3. The battery management arrangement BM furthermore switches the changeover switch US into a second switch position in which the changeover switch US electrically connects the DC voltage converter GW to the positive pole PP2 of the second battery cell group ZG2. The battery management arrangement BM thereby charges the second battery cell group ZG2, or the two battery cell groups ZG1, ZG2 with the current of the current source SQ via a second charging current path LP2 between the charging terminal LA and the second battery cell group ZG1 via the DC voltage converter GW, the changeover switch US and the first and second relays RL1, RL2.

The invention claimed is:

1. A multi-voltage battery device for a hybrid electric/electric vehicle, the multi-voltage battery device comprising:
 a first output current terminal and a ground terminal for providing of a first rated voltage;
 a second output current terminal and the ground terminal for providing a second rated voltage;

a first battery cell group, electrically connected via a first positive pole to the first output current terminal and via a first negative pole to the ground terminal;

a second battery cell group, electrically connected via a second positive pole to the second output current terminal and via a second negative pole to the first output current terminal and is connected switchably in series with the first battery cell group;

a charging current terminal for connecting the multi-voltage battery device to an external current source; and a first DC voltage converter electrically connected on an input voltage side to the charging current terminal and on an output voltage side to the first positive pole, and is configured to convert an input voltage present at the charging current terminal to a first charging voltage for charging the first battery cell group.

2. An onboard electrical system for a hybrid electric/electric vehicle, the onboard electrical system comprising:
a first onboard electrical system branch with a first onboard electrical system voltage;
a second onboard electrical system branch with a second onboard electrical system voltage;
a multi-voltage battery device as claimed in claim 1, that is electrically connected via the first output current terminal to the first onboard electrical system branch and is electrically connected via the second output current terminal to the second onboard electrical system branch.

3. A multi-voltage battery device for a hybrid electric/electric vehicle, the multi-voltage battery device comprising:
a first output current terminal and a ground terminal for providing of a first rated voltage;
a second output current terminal and the ground terminal for providing a second rated voltage;
a first battery cell group, electrically connected via a first positive pole to the first output current terminal and via a first negative pole to the ground terminal;
a second battery cell group, electrically connected via a second positive pole to the second output current terminal and via a second negative pole to the first output current terminal and is connected switchably in series with the first battery cell group;
a charging current terminal for connecting the multi-voltage battery device to an external current source;
a first DC voltage converter electrically connected on an input voltage side to the charging current terminal and on an output voltage side to the first positive pole, and is configured to convert an input voltage present at the charging current terminal to a first charging voltage for charging the first battery cell group; and
a controllable changeover switch that is electrically connected between the first DC voltage converter on one side and the first positive pole and the second positive pole on another side, and is configured to connect electrically the first DC voltage converter on the output voltage side optionally to the first positive pole or to the second positive pole.

4. The multi-voltage battery device as claimed in claim 3, further comprising a second DC voltage converter that is electrically connected on the input voltage side to the charging current terminal and on the output voltage side to the second positive pole, and is configured to convert the input voltage to a second charging voltage for charging the second battery cell group or both the first battery cell group and the second battery cell group.

5. The multi-voltage battery device as claimed in claim 4, further comprising a battery management arrangement for operating the multi-voltage battery device that is electrically connected via supply current terminals between the first positive pole and the ground terminal, and is configured to monitor a charge level of the first battery cell group and, in an event that the charge level of the first battery cell group is critical, to operate the first DC voltage converter to charge the first battery cell group.

6. The multi-voltage battery device as claimed in claim 5, further comprising:
a first controllable switch that is electrically connected in a first charging current path between the first DC voltage converter and the ground terminal;
wherein the battery management arrangement is further configured, in the event that the charge level of the first battery cell group is critical, to close the first controller switch for charging the first battery cell group.

7. The multi-voltage battery device as claimed in claim 6, wherein the first controller switch and/or the second controller switch are/is respectively implemented as a relay.

8. The multi-voltage battery device as claimed in claim 6, further comprising:
a second controllable switch, that is electrically connected in a second charging current path between the charging current terminal and the second battery cell group, and thus switchably connects electrically the second battery cell group to the first battery cell group,
wherein the battery management arrangement is further configured to monitor the charge level of the second battery cell group and, in an event that the charge level of the second battery cell group is critical, to close the second controllable switch for charging the second battery cell group or both the first battery cell group and the second battery cell group.

9. The multi-voltage battery device as claimed in claim 5, further comprising:
a second controllable switch, that is electrically connected in a second charging current path between the charging current terminal and the second battery cell group, and thus switchably connects electrically the second battery cell group to the first battery cell group;
wherein the battery management arrangement is further configured to monitor the charge level of the second battery cell group and, in an event that the charge level of the second battery cell group is critical, to close the second controller switch for charging the second battery cell group or both the first battery cell group and the second battery cell group.

10. The multi-voltage battery device as claimed in claim 9, wherein the first controllable switch and/or the second controllable switch are/is respectively implemented as a relay.

11. The multi-voltage battery device as claimed in claim 5, wherein the battery management arrangement is further configured, in an event that a charge level of the second battery cell group is critical, to operate the second DC voltage converter to charge the second battery cell group or both the first battery cell group and the second battery cell group.

12. The multi-voltage battery device as claimed in claim 5, wherein the battery management arrangement is further configured to monitor charge levels of the first battery cell group and the second battery cell group and
in the event that the charge level of the first battery cell group is critical, to switch the controllable changeover switch into a first switch position for charging the first battery cell group in which the controllable changeover switch electrically connects the first DC voltage converter on the output voltage side to the first positive pole; or in the event that the charge level of the second battery cell group is critical, to switch the controllable changeover switch into a second switch position for charging the second battery cell group or both the first battery cell group and the second battery cell group in which the controllable changeover switch electrically connects the first DC voltage converter on the output voltage side to the second positive pole.

13. The multi-voltage battery device as claimed in claim 12, further comprising a third controllable switch that is electrically connected between the charging current terminal and the second positive pole, wherein the battery management arrangement is further configured to close the third controllable switch and to switch the changeover switch into the first switch position to charge the first battery cell group or the second battery cell group with the current of the respective other battery cell group.

14. The multi-voltage battery device as claimed in claim 13, wherein the third controllable switch is a third relay.

15. The multi-voltage battery device as claimed in claim 12, further comprising a third controllable switch that is electrically connected between the charging current terminal and the second positive pole, wherein the battery management arrangement is further configured to close the third controllable switch and to switch the controllable changeover switch into the first switch position to charge the first battery cell group or the second battery cell group with the current of the respective other battery cell group.

16. The multi-voltage battery device as claimed in claim 5, wherein the battery management arrangement is further configured to monitor charge levels of the first battery cell group and the second battery cell group and in an event that the charge level of the first battery cell group is critical, to switch the controllable changeover switch into a first switch position for charging the first battery cell group in which the controllable changeover switch electrically connects the first DC voltage converter on the output voltage side to the first positive pole; or in an event that the charge level of the second battery cell group is critical, to switch the controllable changeover switch into a second switch position for charging the second battery cell group or both the first battery cell group and the second battery cell group in which the controllable changeover switch electrically connects the first DC voltage converter on the output voltage side to the second positive pole.

17. The multi-voltage battery device as claimed in claim 5, wherein the battery management arrangement is further configured, in an event that the charge level of the second battery cell group is critical, to operate the second DC voltage converter to charge the second battery cell group or both the first battery cell group and the second battery cell group.

18. A multi-voltage battery device for a hybrid electric/electric vehicle, the multi-voltage battery device comprising:
- a first output current terminal and a ground terminal for providing of a first rated voltage;
- a second output current terminal and the ground terminal for providing a second rated voltage;
- a first battery cell group, electrically connected via a first positive pole to the first output current terminal and via a first negative pole to the ground terminal;
- a second battery cell group, electrically connected via a second positive pole to the second output current terminal and via a second negative pole to the first output current terminal and is connected switchably in series with the first battery cell group;
- a charging current terminal for connecting the multi-voltage battery device to an external current source; and
- a first DC voltage converter electrically connected on an input voltage side to the charging current terminal and on an output voltage side to the first positive pole, and is configured to convert an input voltage present at the charging current terminal to a first charging voltage for charging the first battery cell group, wherein the charging current terminal is electrically connected to the second positive pole.

19. The multi-voltage battery device as claimed in claim 18, wherein the first DC voltage converter is further configured to charge the first battery cell group with current from the second battery cell group, and/or to charge the second battery cell group with current from the first battery cell group.

20. The multi-voltage battery device as claimed in claim 19, further comprising a second DC voltage converter that is electrically connected on the input voltage side to the charging current terminal and on the output voltage side to the second positive pole, and is configured to convert the input voltage to a second charging voltage for charging the second battery cell group or both the first battery cell group and the second battery cell group.

* * * * *